(12) United States Patent
Li et al.

(10) Patent No.: US 9,716,445 B2
(45) Date of Patent: Jul. 25, 2017

(54) INVERTER GRID-CONNECTED SYSTEM AND METHOD FOR IMPLEMENTING THREE-PHASE ALTERNATING CURRENT GRID-CONNECTED TRANSITION

(71) Applicant: DELTA ELECTRONICS, INC., Taoyuan County (TW)

(72) Inventors: Chih-Chang Li, Taoyuan County (TW); Wei-Lun Hsin, Taoyuan County (TW); Xin-Hung Lin, Taoyuan County (TW)

(73) Assignee: DELTA ELECTRONICS, INC., Taoyuan (TW)

( * ) Notice: Subject to any disclaimer, the term of this patent is extended or adjusted under 35 U.S.C. 154(b) by 64 days.

(21) Appl. No.: 14/973,829

(22) Filed: Dec. 18, 2015

(65) Prior Publication Data

US 2016/0373026 A1 Dec. 22, 2016

(30) Foreign Application Priority Data

Jun. 17, 2015 (TW) .............................. 104119508 A

(51) Int. Cl.
*H02M 7/537* (2006.01)
*H02M 1/36* (2007.01)
(Continued)

(52) U.S. Cl.
CPC ............... *H02M 7/537* (2013.01); *H02J 3/26* (2013.01); *H02J 3/40* (2013.01); *H02M 1/36* (2013.01);
(Continued)

(58) Field of Classification Search
CPC .. H02M 1/36; H02M 7/44; H02M 7/53; H02J 3/26; H02J 3/40
See application file for complete search history.

(56) References Cited

U.S. PATENT DOCUMENTS 6,979,914 B2 12/2005 McKelvey et al.
7,800,248 B2 * 9/2010 Kramer .................... H02J 3/38
307/19
(Continued)

FOREIGN PATENT DOCUMENTS

| EP | 2709226 | 3/2014 |
| JP | 2002-260476 | 9/2002 |
| JP | 2006-518581 | 8/2006 |

OTHER PUBLICATIONS

Office Action dated Feb. 21, 2017 from corresponding application No. JP 2015-255851.
(Continued)

*Primary Examiner* — Timothy J Dole
*Assistant Examiner* — Yusef Ahmed
(74) *Attorney, Agent, or Firm* — Hauptman Ham, LLP

(57) ABSTRACT

A controller controls a first switch, a second switch, a third switch, a fourth switch, a fifth switch and a sixth switch, so that an alternating current electric power is fed to an alternating current electric grid. Moreover, the controller firstly turns on a first route including the first switch and the second switch, and then the controller turns on a second route including the third switch and the fourth switch if the second route meets a first specific condition, and then the controller turns on a third route including the fifth switch and the sixth switch if the third route meets a second specific condition.

15 Claims, 10 Drawing Sheets

(51) Int. Cl.
*H02J 3/26* (2006.01)
*H02J 3/40* (2006.01)
*H02J 3/00* (2006.01)

(52) U.S. Cl.
CPC ......... *H02J 2003/001* (2013.01); *Y02E 10/56* (2013.01)

(56) References Cited

U.S. PATENT DOCUMENTS

| | | | | |
|---|---|---|---|---|
| 8,259,474 B2* | 9/2012 | Blasko | ................. | H02M 5/271 318/802 |
| 2003/0197431 A1* | 10/2003 | Lathrop | ................... | H02J 9/08 307/125 |
| 2005/0105306 A1* | 5/2005 | Deng | ................. | H02M 5/4585 363/37 |
| 2008/0291698 A1* | 11/2008 | Yamamoto | ........ | H02M 3/33507 363/10 |
| 2013/0235629 A1* | 9/2013 | Zhan | ....................... | H02M 1/36 363/49 |
| 2015/0092461 A1* | 4/2015 | Epps | ....................... | H02M 3/24 363/65 |
| 2015/0102689 A1* | 4/2015 | Persson | ..................... | H02J 3/01 307/105 |
| 2015/0295506 A1* | 10/2015 | Inomata | ................ | H02M 5/271 323/282 |
| 2016/0099569 A1* | 4/2016 | Rilling | ............... | G01R 31/3278 307/125 |
| 2016/0190809 A1* | 6/2016 | Ma | ......................... | H02M 7/49 307/77 |
| 2016/0352252 A1* | 12/2016 | Yu | ......................... | H02M 7/537 |
| 2017/0093332 A1* | 3/2017 | Lee | ........................ | H02S 40/32 |

OTHER PUBLICATIONS

The extended European search report dated Oct. 10, 2016 from corresponding application No. EP 16150990.6.

* cited by examiner

INVERTER GRID-CONNECTED SYSTEM AND METHOD FOR IMPLEMENTING THREE-PHASE ALTERNATING CURRENT GRID-CONNECTED TRANSITION

BACKGROUND OF THE INVENTION

Field of the Invention

The present invention relates to a grid-connected system and a grid-connected method, and especially relates to an inverter grid-connected system and a method for implementing three-phase alternating current grid-connected transition.

Description of the Related Art

FIG. 1 shows a block diagram of the related art photovoltaic inverter grid-connected system. A photovoltaic inverter grid-connected system 1 is arranged between a direct current voltage source Vin and an alternating current electric grid 2. The photovoltaic inverter grid-connected system 1 converts a direct current electric power provided by the direct current voltage source Vin into an alternating current electric power and then feeds the alternating current electric power to the alternating current electric grid 2. The photovoltaic inverter grid-connected system 1 comprises a boost module 10, an inverter module 12, a filter 14 and a switching module 16. The boost module 10 is electrically connected to the direct current voltage source Vin. The inverter module 12 is electrically connected to the boost module 10. The filter 14 is electrically connected to the inverter module 12. The switching module 16 is coupled between the filter 14 and the alternating current electric grid 2.

The switching module 16 comprises a first switch S1, a second switch S2, a third switch S3, a fourth switch S4, a fifth switch S5 and a sixth switch S6. The first switch S1 and the fifth switch S5 are connected in series between the filter 14 and the alternating current electric grid 2. The second switch S2 and the third switch S3 are connected in series between the filter 14 and the alternating current electric grid 2. The sixth switch S6 and the fourth switch S4 are connected in series between the filter 14 and the alternating current electric grid 2. Moreover, the switching module 16 is composed of three double pole double throw relays. A relay 160 is composed of the first switch S1 and the second switch S2. Another relay 162 is composed of the third switch S3 and the fourth switch S4. Still another relay 164 is composed of the fifth switch S5 and the sixth switch S6. Two switches (S1 and S2, or S3 and S4, or S5 and S6) in each of the relays (160, or 162, or 164) will be turned on or off at the same time.

FIG. 2 shows a flow chart of the connecting method for the related art switching module. In practical use, when the photovoltaic inverter grid-connected system 1 is connected to the alternating current electric grid 2, the connecting method for the first switch S1, the second switch S2, the third switch S3, the fourth switch S4, the fifth switch S5 and the sixth switch S6 comprises following steps in order. Step S101: The first switch S1 and the second switch S2 are turned on (namely, the first switch S1 and the second switch S2 are in the closed circuit status). Step S103: The first switch S1 and the second switch S2 are turned off (namely, the first switch S1 and the second switch S2 are in the open circuit status), and the third switch S3 and the fourth switch S4 are turned on. Step S105: The third switch S3 and the fourth switch S4 are turned off, and the fifth switch S5 and the sixth switch S6 are turned on. Step S106: The fifth switch S5 and the sixth switch S6 are turned off. Step S107: Determines whether the first switch S1, the second switch S2, the third switch S3, the fourth switch S4, the fifth switch S5 and the sixth switch S6 are abnormal or not. Step S109: After step S107, if the first switch S1, the second switch S2, the third switch S3, the fourth switch S4, the fifth switch S5 and the sixth switch S6 are normal, then the first switch S1, the second switch S2, the third switch S3, the fourth switch S4, the fifth switch S5 and the sixth switch S6 are turned on at the same time and the photovoltaic inverter grid-connected system 1 proceeds to connect to the alternating current electric grid 2. Step S110: After step S107, if one of the first switch S1, the second switch S2, the third switch S3, the fourth switch S4, the fifth switch S5 and the sixth switch S6 is abnormal, then the photovoltaic inverter grid-connected system 1 does not connect to the alternating current electric grid 2.

FIG. 3 shows a current waveform diagram of the related art photovoltaic inverter grid-connected system connecting to the alternating current electric grid and shows a sequence diagram of turning-on or turning-off these switches S1~S6. A high level signal indicates that at least one of these switches S1~S6 are tuned on. A low level signal indicates that at least one of these switches S1~S6 are tuned off.

At the timing t1, the first switch S1 and the second switch S2 are turned on. At the timing t2, the first switch S1 and the second switch S2 are turned off, and the third switch S3 and the fourth switch S4 are turned on. At the timing t3, the third switch S3 and the fourth switch S4 are turned off, and the fifth switch S5 and the sixth switch S6 are turned on. At the timing t4, the fifth switch S5 and the sixth switch S6 are turned off. At the timing t5, the first switch S1, the second switch S2, the third switch S3, the fourth switch S4, the fifth switch S5 and the sixth switch S6 are turned on at the same time.

The photovoltaic inverter grid-connected system 1 mentioned above firstly detects whether the switching functions of these switches S1~S6 are normal or not. If the switching functions of these switches S1~S6 are normal, the switches S1~S6 are turned on at the same time. Therefore, the operation is simple. However, at the moment when these switches S1~S6 are turned on at the same time, a huge inrush current will be generated, as shown in FIG. 3. This huge inrush current will shorten the lives of these switches S1~S6. Moreover, at least one of the switches S1~S6 will be damaged (for example, the first switch S1 is damaged as show in FIG. 3) when the photovoltaic inverter grid-connected system 1 is connected to the alternating current electric grid 2. Therefore, the photovoltaic inverter grid-connected system 1 cannot be connected to the alternating current electric grid 2.

SUMMARY OF THE INVENTION

The present invention provides an inverter grid-connected system and a method for implementing three-phase alternating current grid-connected transition. The present invention can avoid generating the inrush current when the inverter grid-connected system is connected to the alternating current electric grid.

The inverter grid-connected system is applied to feed an alternating current electric power to a three-phase alternating current electric grid. The inverter grid-connected system comprises an inverter module, a switching module and a controller. The inverter module converts a direct current electric power into the alternating current electric power. The switching module is coupled between the inverter module and the three-phase alternating current electric grid.

The alternating current electric power is connected to the three-phase alternating current electric grid through the switching module when a first specific condition and a second specific condition are met. The switching module comprises a first switch, a second switch, a third switch, a fourth switch, a fifth switch and a sixth switch. The first switch is connected to the second switch in series to form a first route. The third switch is connected to the fourth switch in series to form a second route. The fifth switch is connected to the sixth switch in series to form a third route. The controller is electrically connected to the switching module to control the switching module, so that the alternating current electric power is fed to the three-phase alternating current electric grid. The controller firstly turns on the first route, and then the controller turns on the second route if the third switch and the fourth switch in the second route meet the first specific condition, and then the controller turns on the third route if the fifth switch and the sixth switch in the third route meet the second specific condition.

The method for implementing three-phase alternating current grid-connected transition is used to feed an alternating current electric power generated by an inverter module into a three-phase alternating current electric grid. The method comprises following steps. (a) A first route between the inverter module and the three-phase alternating current electric grid is turned on. (b) A second route between the inverter module and the three-phase alternating current electric grid is turned on if a first specific condition is met. (c) A third route between the inverter module and the three-phase alternating current electric grid is turned on if a second specific condition is met.

According to the inverter grid-connected system and the method of the present invention, the present invention can effectively avoid generating the inrush current when the inverter grid-connected system is connected to the alternating current electric grid. Therefore, the probability of the damage of the switching module is reduced, so that the life of the switching module is prolonged.

DETAILED DESCRIPTION OF THE INVENTION

Please refer to following detailed description and figures for the technical content of the present invention. The following detailed description and figures are referred for the present invention, but the present invention is not limited to it.

The present invention provides an inverter grid-connected system and a method for implementing three-phase alternating current grid-connected transition. The present invention can effectively avoid generating the inrush current when the inverter grid-connected system is connected to the alternating current electric grid. Therefore, the probability of the damage of the switching module is reduced, so that the life of the switching module is prolonged. The inverter grid-connected system is used for converting a direct current electric power into an alternative current electric power and fed the alternative current electric power to the alternative current electric grid, and the direct current electric power may be provided by photovoltaics or battery. Thereafter, the inverter grid-connected system is exemplified by a photovoltaic inverter grid-connected system.

Figure 1:
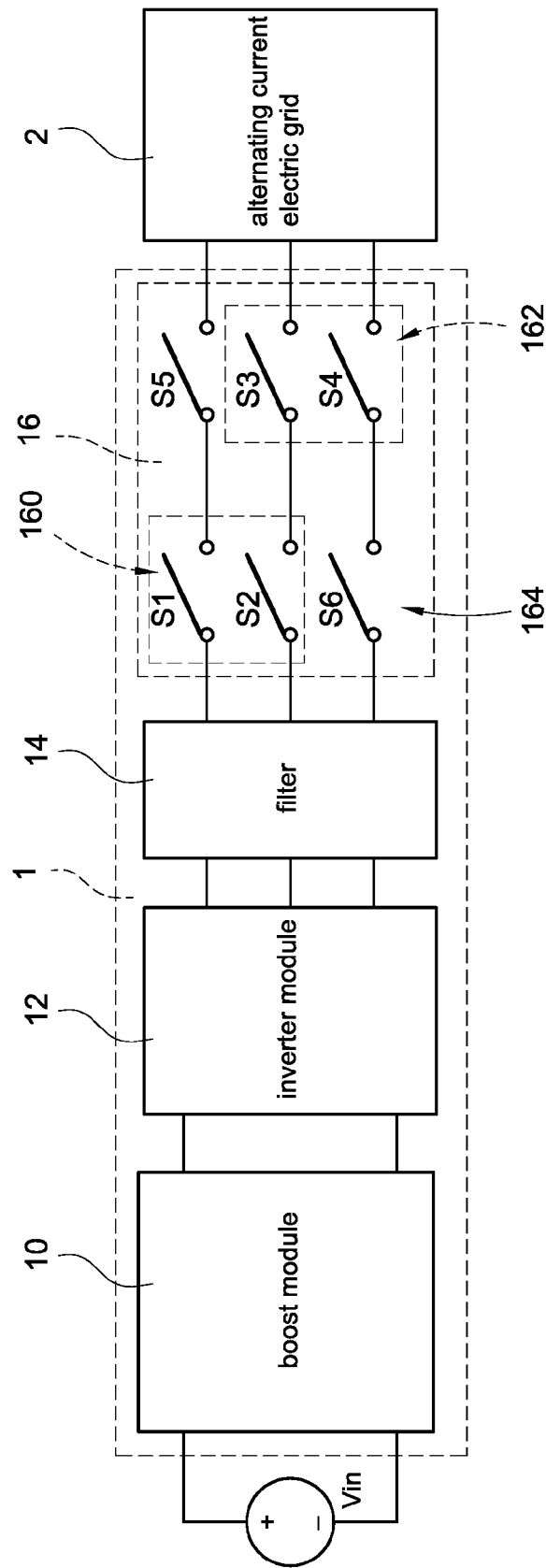
FIG. 1 shows a block diagram of the related art photovoltaic inverter grid-connected system.
Figure 2:
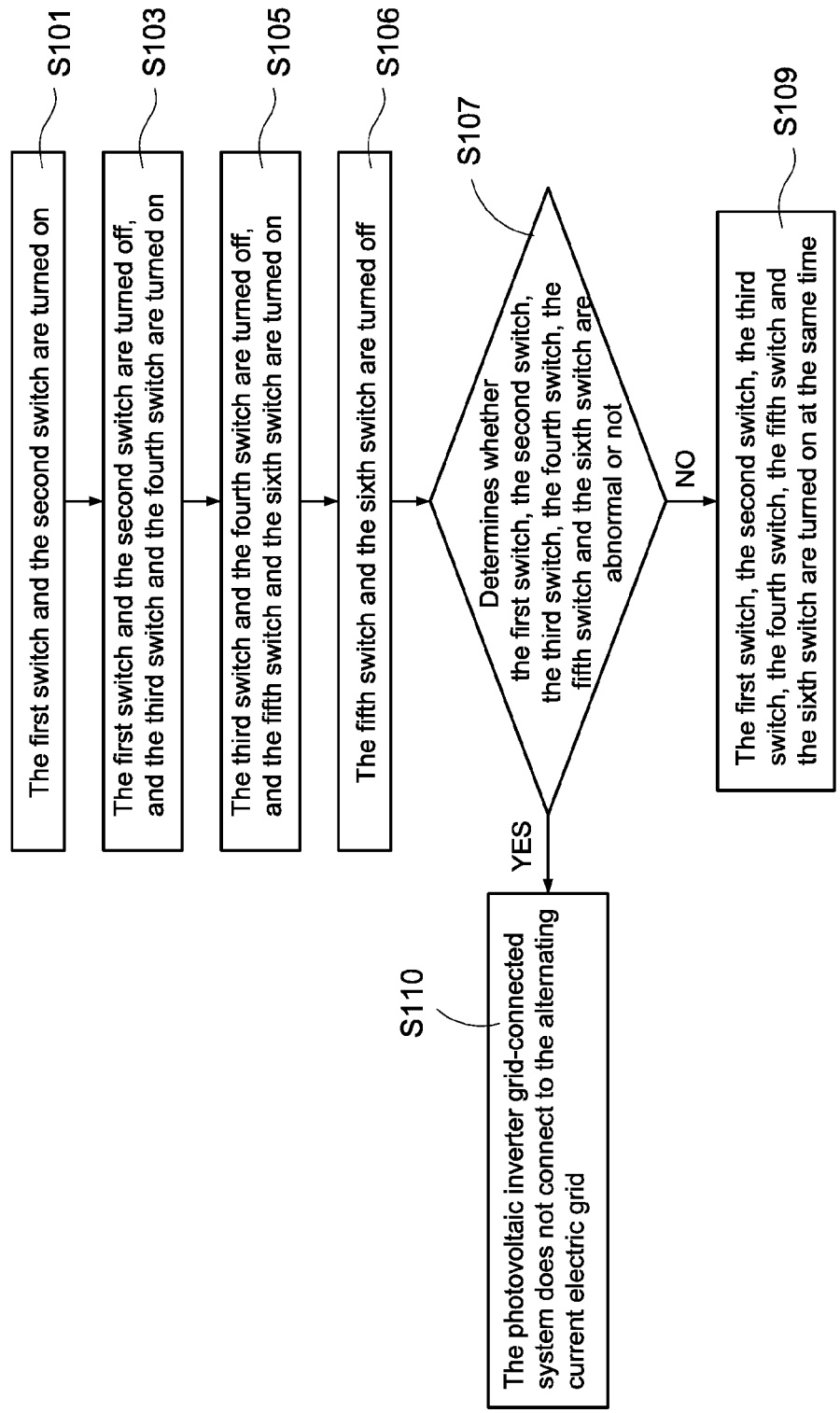
FIG. 2 shows a flow chart of the connecting method for the related art switching module.
Figure 3:
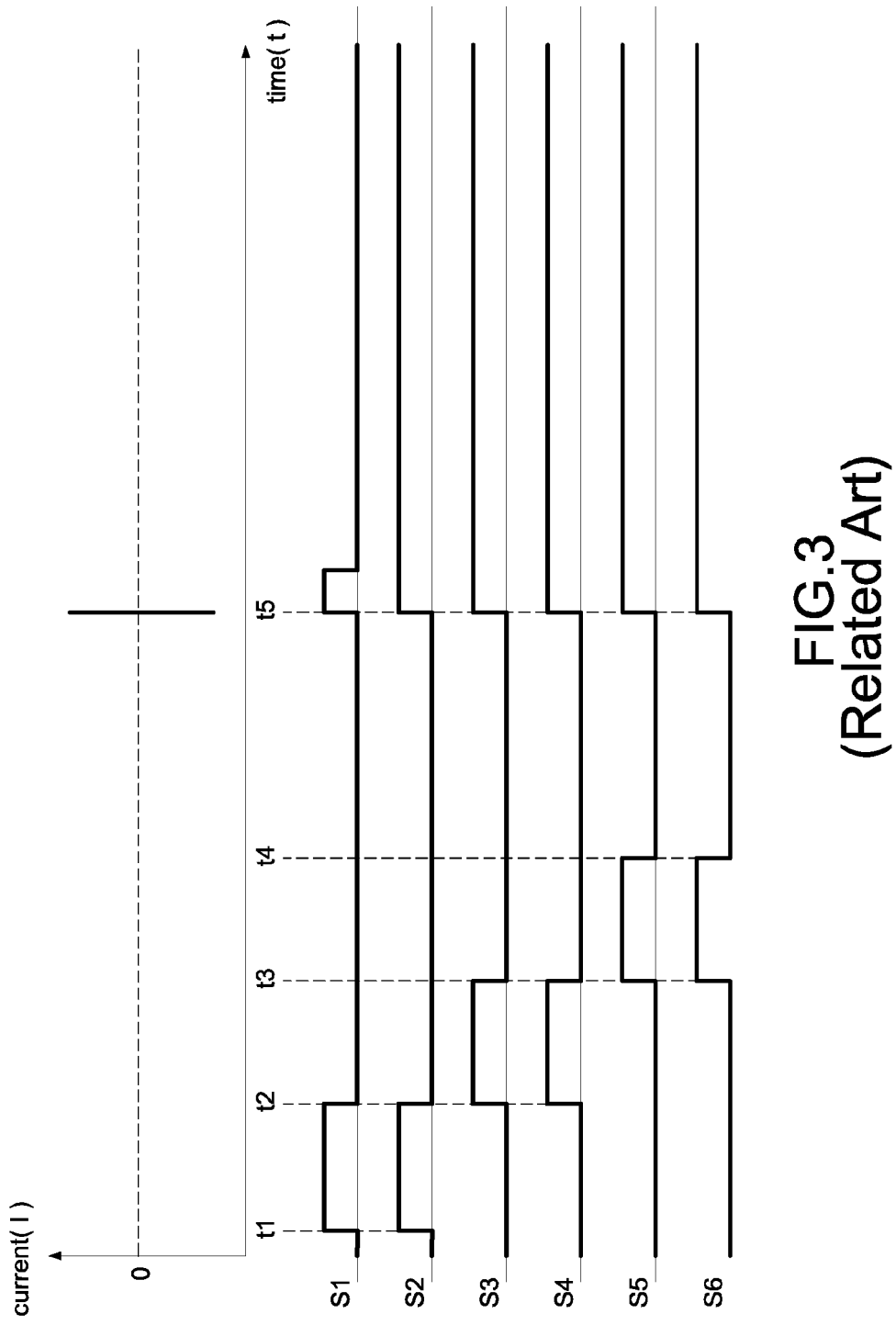
FIG. 3 shows a current waveform diagram of the related art photovoltaic inverter grid-connected system connecting to the alternating current electric grid and shows a sequence diagram of turning-on or turning-off these switches S1~S6.
Figure 4:
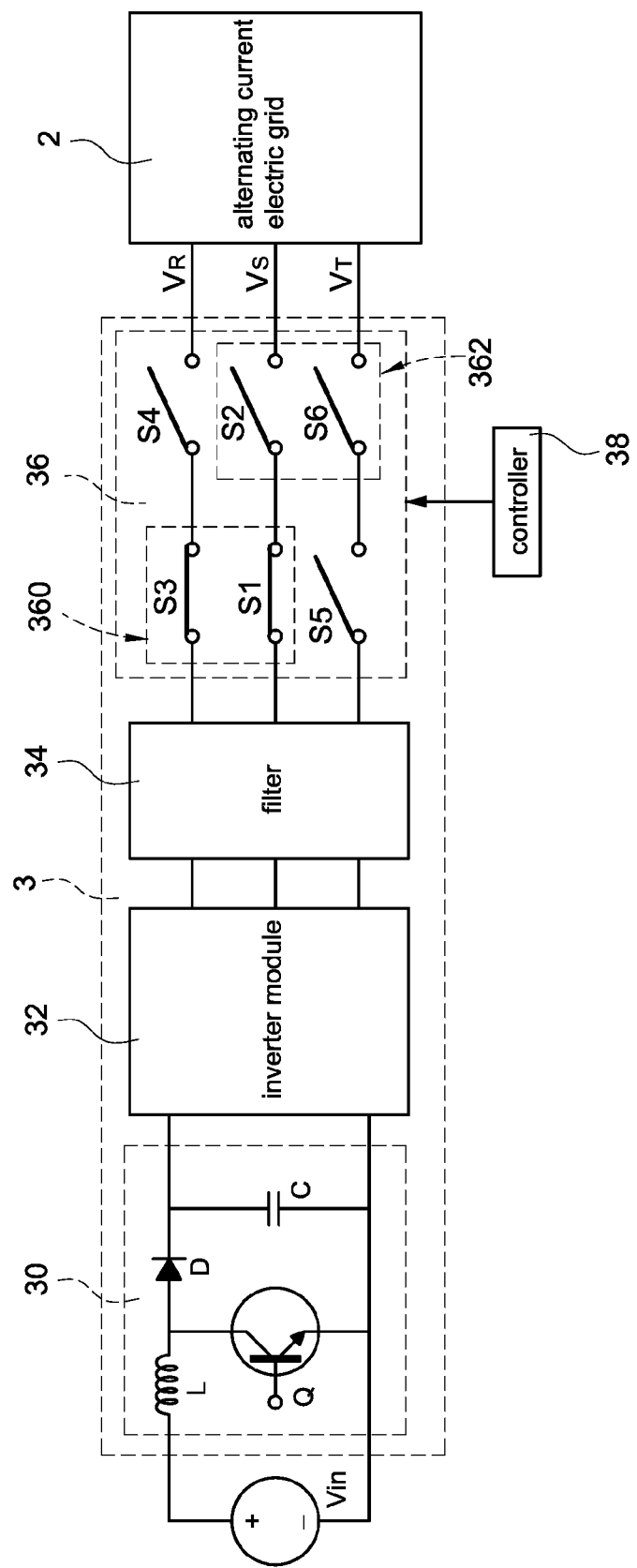
FIG. 4 shows a block diagram of the photovoltaic inverter grid-connected system of the present invention.

FIG. 4 shows a block diagram of the photovoltaic inverter grid-connected system of the present invention. A photovoltaic inverter grid-connected system 3 is arranged between a direct current source (for example, a direct current voltage source Vin) and an alternating current electric grid 2. The alternating current electric grid 2 is a three-phase alternating current electric grid and comprises a first phase side (namely, R-phase side), a second phase side (namely, S-phase side) and a third phase side (namely, T-phase side). VR indicates the voltage of the first phase side, VS indicates the voltage of the second phase side, and VT indicates the voltage of the third phase side.

The photovoltaic inverter grid-connected system 3 comprises a voltage level adjusting module 30, an inverter module 32, a filter 34 and a switching module 36.

The voltage level adjusting module 30 is electrically connected to the direct current voltage source Vin. As shown in FIG. 4, the voltage level adjusting module 30 is a boost circuit comprising an inductor L, a switching component Q, a diode D and a capacitor C. The switching component Q can be a bipolar junction transistor. One side of the inductor L is connected to a high voltage side of the direct current voltage source Vin. The other side of the inductor L is connected to an anode of the diode D and a collector of the switching component Q. The capacitor C is connected to a cathode of the diode D, an emitter of the switching component Q and a low voltage side of the direct current voltage source Vin. A controller (not shown in FIG. 4) is configured to turn on or turn off the switching component Q, so that a direct current voltage supplied by the direct current voltage source Vin is boosted. In practical use, the voltage level adjusting module 30 can be a buck circuit as well. The switching component Q can be an insulated gate bipolar transistor (IGBT) with a small driving current and a low turn-on resistance.

The inverter module 32 is electrically connected to the voltage level adjusting module 30. The inverter module 32 converts the direct current electric power supplied by the direct current voltage source Vin into an alternating current electric power and feeds the alternating current electric power to the alternating current electric grid 2 after the grid-connection between the photovoltaic inverter grid-connected system 3 and the alternating current electric grid 2 is successful. The filter 34 is electrically connected to the inverter module 32 and is used to filter noises in the alternating current electric power.

The switching module 36 is coupled between the filter 34 and the alternating current electric grid 2. The switching module 36 comprises a first switch S1, a second switch S2, a third switch S3, a fourth switch S4, a fifth switch S5 and a sixth switch S6. Two of these switches S1~S6 of the switching module 36 are connected in series between the filter 34 and the alternating current electric grid 2 to provide the single fault protection mechanism to avoid damaging the alternating current electric grid 2 and people in the single fault situation. As shown in FIG. 4, the first switch S1 and the second switch S2 are connected in series to form a first route. The third switch S3 and the fourth switch S4 are connected in series to form a second route. The fifth switch S5 and the sixth switch S6 are connected in series to form a third route.

In an embodiment, a first relay 360 is composed of the first switch S1 and the third switch S3. When the first relay 360 is turned on, the first switch S1 and the third switch S3 are turned on at the same time. A second relay 362 is composed of the second switch S2 and the sixth switch S6. When the second relay 362 is turned on, the second switch S2 and the sixth switch S6 are turned on at the same time.

Figure 8:
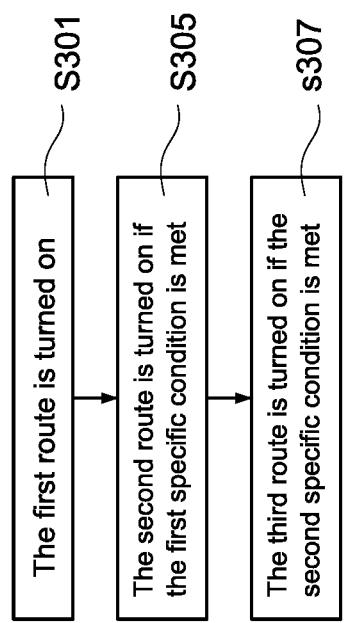
FIG. 8 shows a flow chart of the connecting method for the switching module of the present invention.

FIG. 8 shows a flow chart of the connecting method for the switching module of the present invention. When the photovoltaic inverter grid-connected system 3 is connected to the alternating current electric grid 2, the connecting method for the switching module 36 is as following.

Firstly, the first route is turned on (step S301). As shown in FIG. 4, the controller 38 turns on the first switch S1, the second switch S2, the third switch S3 and the sixth switch S6, so that the first route is turned on.

Figure 9:
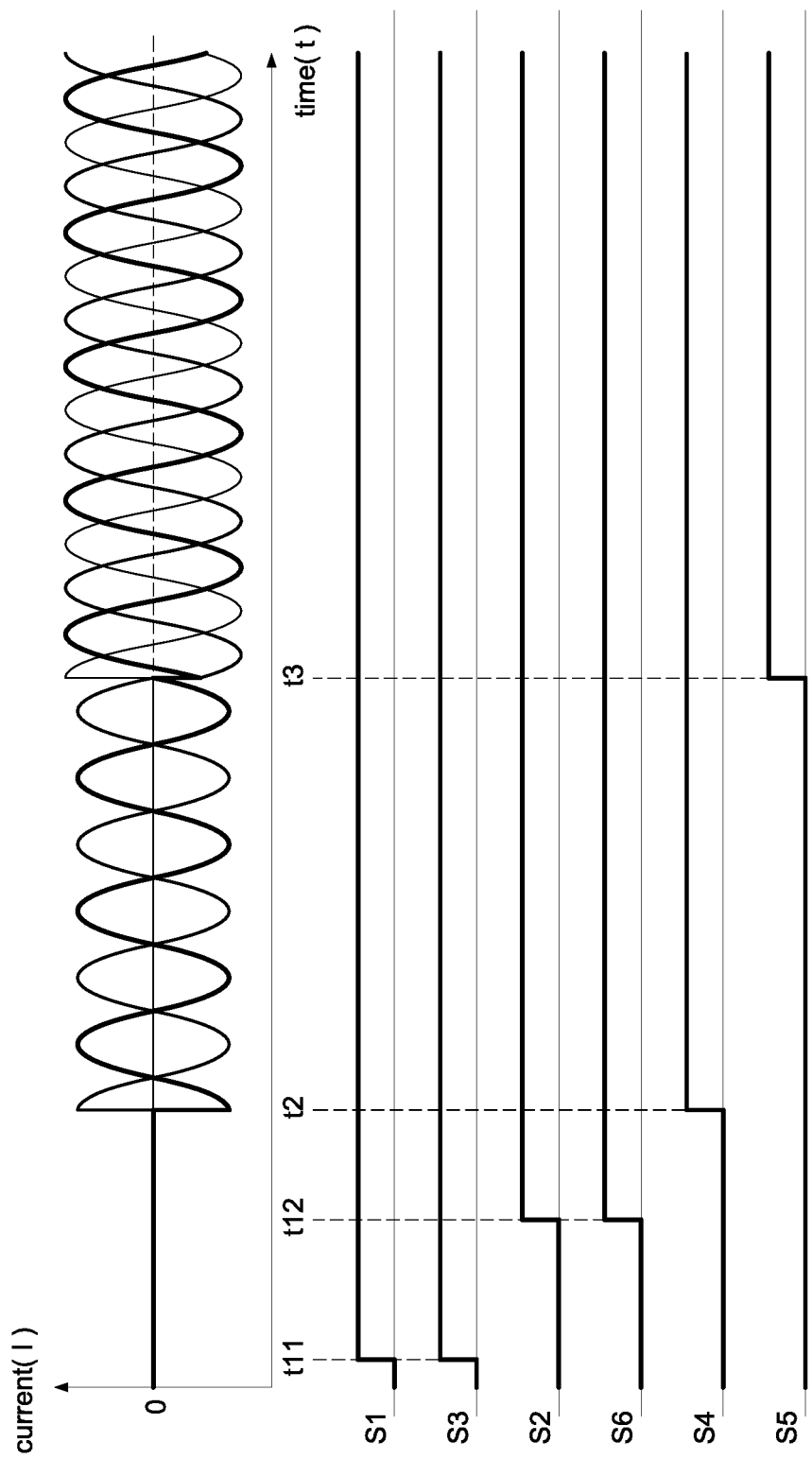
FIG. 9 shows a current waveform diagram of the photovoltaic inverter grid-connected system of the present invention connecting to the alternating current electric grid and shows a sequence diagram of turning-on or turning-off these switches S1~S6.

Moreover, the controller 38 turns on the first switch S1 and the third switch S3 firstly, and then the controller 38 turns on the second switch S2 and the sixth switch S6. In another word, the controller 38 turns on the first relay 360 firstly, and then the controller 38 turns on the second relay 362. FIG. 9 shows a current waveform diagram of the photovoltaic inverter grid-connected system of the present invention connecting to the alternating current electric grid and shows a sequence diagram of turning-on or turning-off these switches S1~S6. In FIG. 9, high level signals indicate that these switches S1~S6 are turned on. Low level signals indicate that these switches S1~S6 are turned off. At the timing t11, the first switch S1 and the third switch S3 are turned on. At the timing t12, the second switch S2 and the sixth switch S6 are turned on. Therefore, the first route is turned on.

Figure 10:
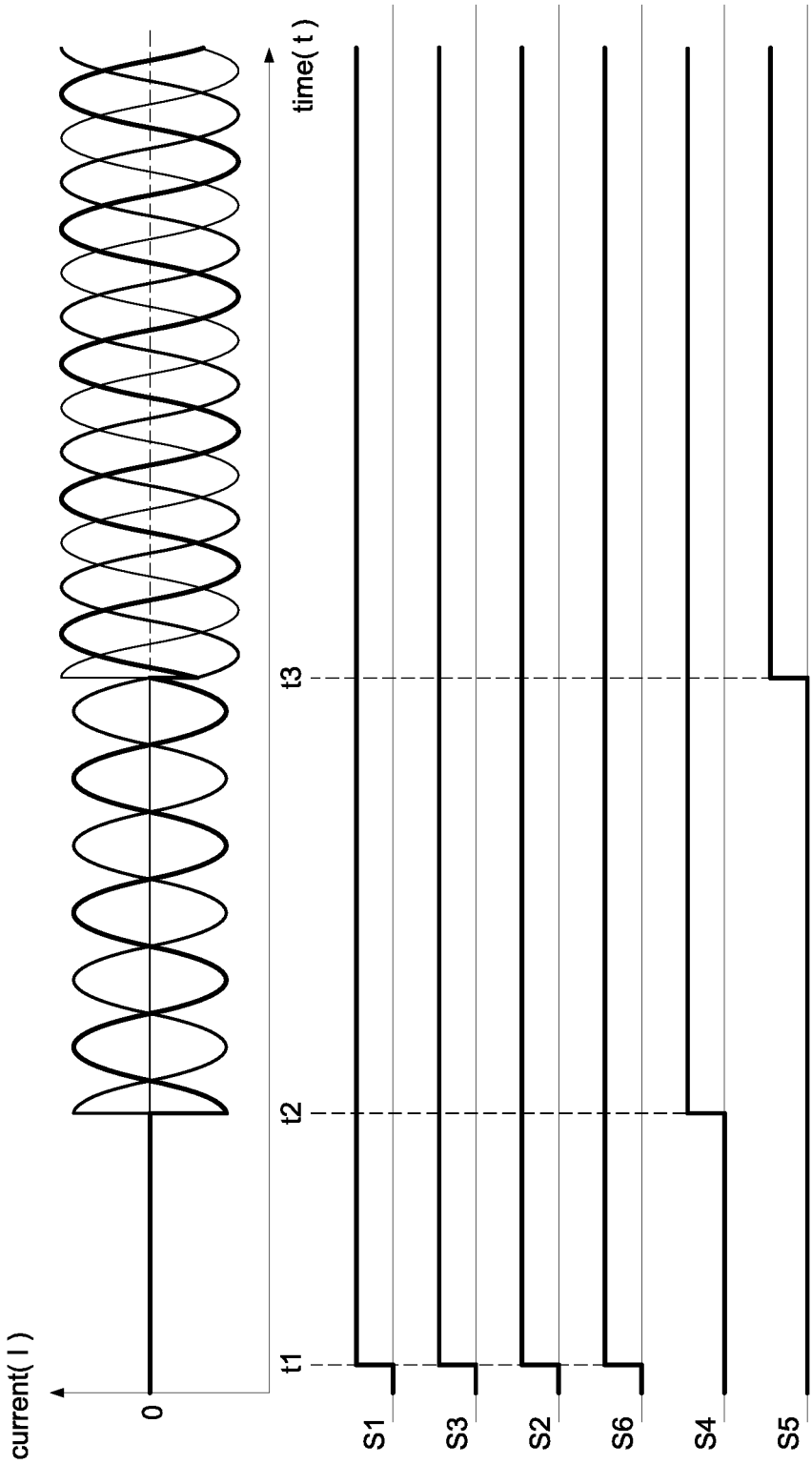
FIG. 10 shows a current waveform diagram of the photovoltaic inverter grid-connected system of the present invention connecting to the alternating current electric grid and shows another sequence diagram of turning-on or turning-off these switches S1~S6.

In another embodiment of the present invention, the controller 38 turns on the first switch S1, the second switch S2, the third switch S3 and the sixth switch S6 at the same time. In another word, the first relay 360 and the second relay 362 are turned on at the same time. FIG. 10 shows a current waveform diagram of the photovoltaic inverter grid-connected system of the present invention connecting to the alternating current electric grid and shows another sequence diagram of turning-on or turning-off these switches S1~S6. In FIG. 10, high level signals indicate that these switches S1~S6 are turned on. Low level signals indicate that these switches S1~S6 are turned off. At the timing t1, the first switch S1, the second switch S2, the third switch S3 and the sixth switch S6 are turned on, so that the first route is turned on.

Figure 5:
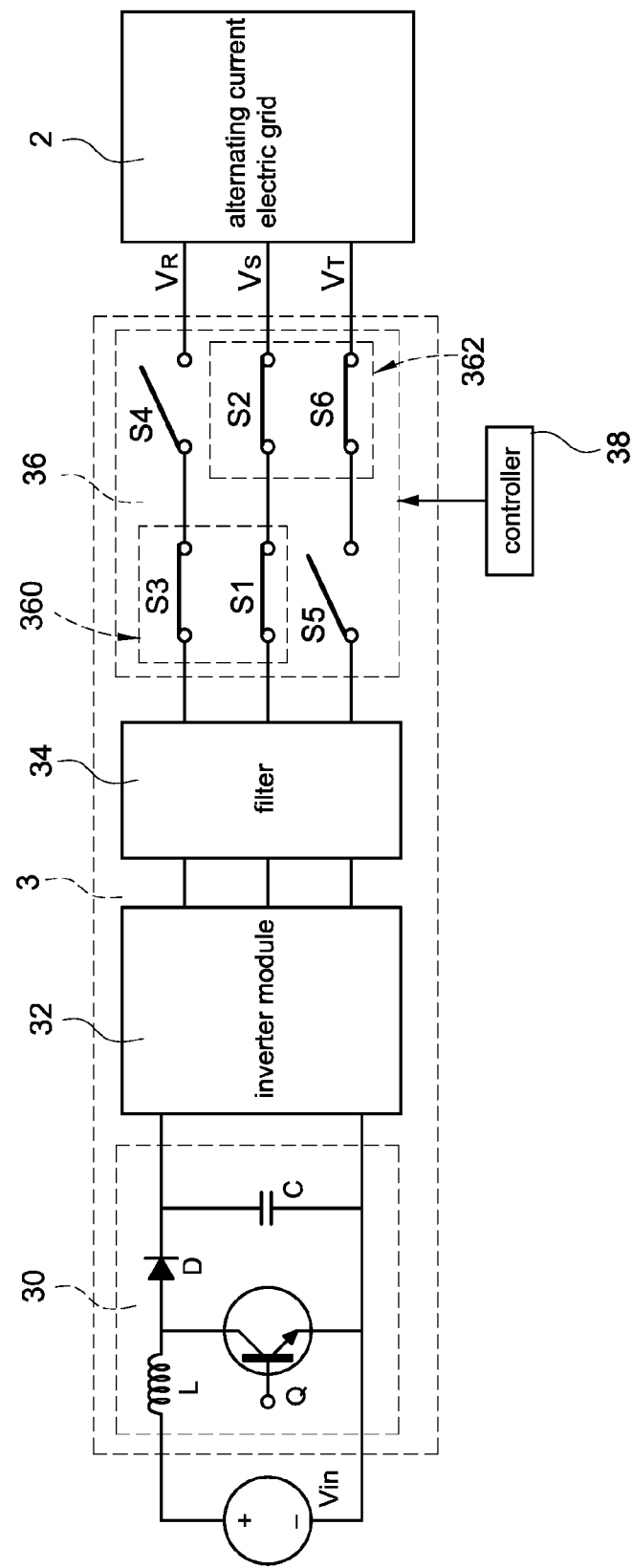
FIG. 5 shows another block diagram of the photovoltaic inverter grid-connected system of the present invention.
Figure 6:
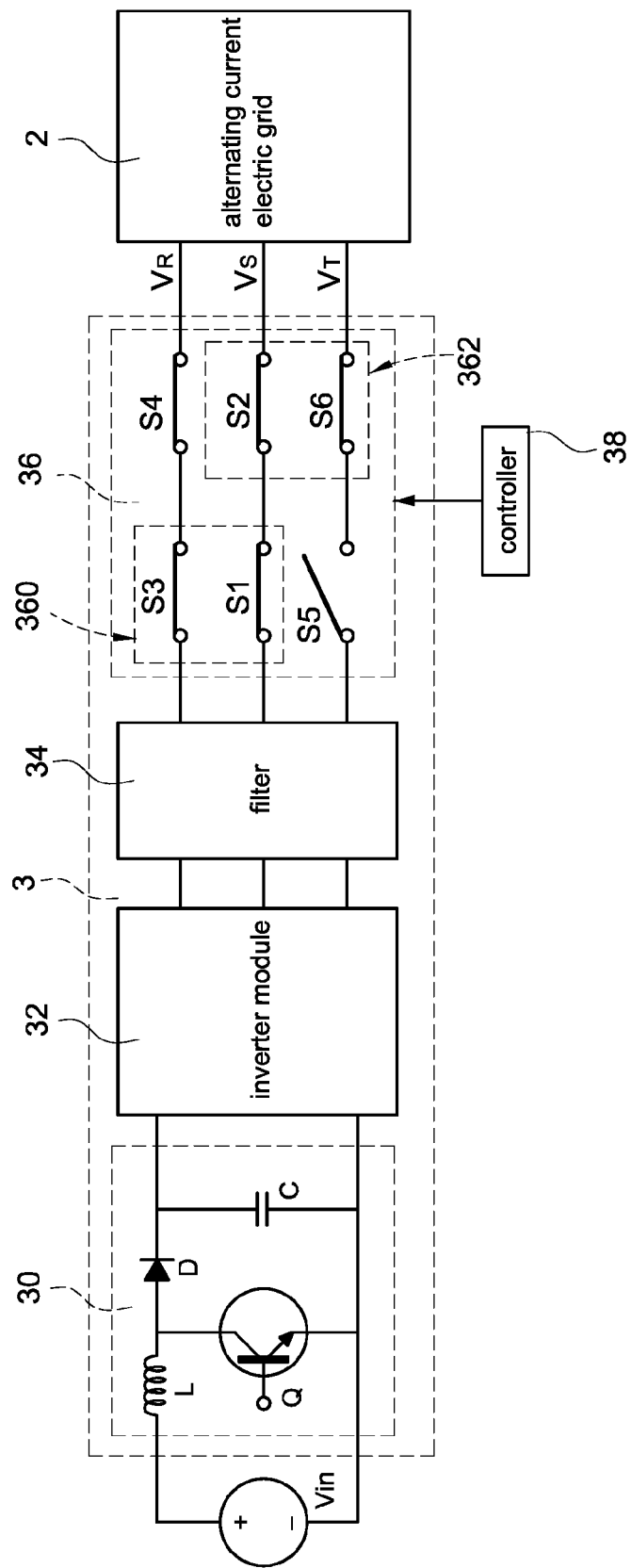
FIG. 6 shows still another block diagram of the photovoltaic inverter grid-connected system of the present invention.
Figure 7:
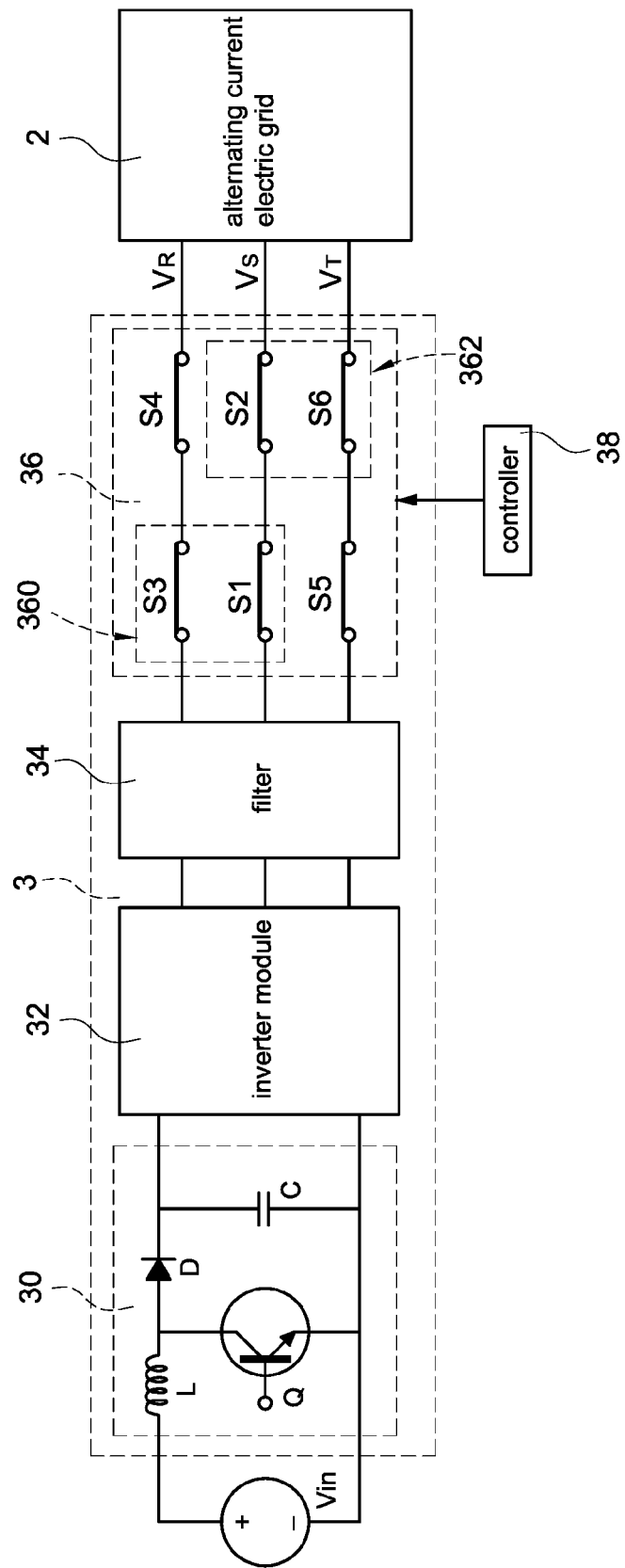
FIG. 7 shows still another block diagram of the photovoltaic inverter grid-connected system of the present invention.

FIG. 5 shows another block diagram of the photovoltaic inverter grid-connected system of the present invention. FIG. 6 shows still another block diagram of the photovoltaic inverter grid-connected system of the present invention. FIG. 7 shows still another block diagram of the photovoltaic inverter grid-connected system of the present invention. As shown in FIG. 5, the third switch S3 is turned on. Then, transient voltages of two sides of the fourth switch S4 are detected, wherein the transient voltage difference is equal to a voltage difference between the first phase side and the second phase side of the alternating current electric grid 2. When the transient voltages of two sides of the fourth switch S4 are equal (namely, meets a first specific condition VR−VS=0), the fourth switch S4 is turned on to turn on the second route. In another word, when two sides of the third switch S3 and the fourth switch S4 have the same voltage level, the second route is turned on (step S305). As shown in FIG. 9 and FIG. 10, at the timing t2, the fourth switch S4 is turned on.

As shown in FIG. 5, the sixth switch S6 is turned on. Transient voltages of two sides of the fifth switch S5 are detected, wherein the transient voltage difference is equal to a voltage difference between the first phase side, the second phase side and the third phase side of the alternating current electric grid 2. When the transient voltages of two sides of the fifth switch S5 are equal (namely, meets a second specific condition VR+VS−VT=0), the controller 38 turns on the fifth switch S5 to turn on the third route. In another word, when two sides of the fifth switch S5 and the sixth switch S6 have the same voltage level, the third route is turned on (step S307). As shown in FIG. 9 and FIG. 10, at the timing t3, the fifth switch S5 is turned on.

In another embodiment of the present invention, the switching module 36 comprises six switches independently controlled. The controller 38 firstly turns on the first switch S1 and the second switch S2 to turn on the first route. Then, the controller 38 turns on the third switch S3 and the fourth switch S4 at the same time to turn on the second route when the voltage difference between the first phase side and the second phase side of the alternating current electric grid 2 meets the first specific condition VR−VS=0. The feature of the present invention is the order of the conduction routes and the timing, but not limited to the order of the turning-on of the switches.

Although the present invention has been described with reference to the preferred embodiment thereof, it will be understood that the invention is not limited to the details thereof. Various substitutions and modifications have been suggested in the foregoing description, and others will occur to those of ordinary skill in the art. Therefore, all such substitutions and modifications are intended to be embraced within the scope of the invention as defined in the appended claims.

What is claimed is:

1. An inverter grid-connected system applied to feed an alternating current electric power to a three-phase alternating current electric grid, the inverter grid-connected system comprising:
   an inverter module converting a direct current electric power into the alternating current electric power;
   a switching module coupled between the inverter module and the three-phase alternating current electric grid, the switching module comprising a first switch, a second switch, a third switch, a fourth switch, a fifth switch and a sixth switch, the first switch connected to the second switch in series to form a first route, the third switch connected to the fourth switch in series to form a second route, the fifth switch connected to the sixth switch in series to form a third route; and a controller electrically connected to the switching module to control the switching module, so that the alternating current electric power is fed to the three-phase alternating current electric grid, wherein the controller firstly turns on the first route, and then the controller turns on the second route if the third switch and the fourth switch in the second route meet a first specific condition, and then the controller turns on the third route if the fifth switch and the sixth switch in the third route meet a second specific condition.

2. The inverter grid-connected system in claim 1, wherein the first specific condition is that a voltage level of a side of the inverter module connected to the second route is equal to a voltage level of a side of the three-phase alternating current electric grid connected to the second route.

3. The inverter grid-connected system in claim 1, wherein the second specific condition is that a voltage level of a side of the inverter module connected to the third route is equal to a voltage level of a side of the three-phase alternating current electric grid connected to the third route.

4. The inverter grid-connected system in claim 1, wherein a first relay is composed of the first switch and the third switch; when the first relay is turned on, the first switch and the third switch are turned on at the same time.

5. The inverter grid-connected system in claim 4, wherein a second relay is composed of the second switch and the sixth switch; when the second relay is turned on, the second switch and the sixth switch are turned on at the same time.

6. The inverter grid-connected system in claim 5, wherein after the first relay is turned on, the second relay is turned on.

7. The inverter grid-connected system in claim 6, wherein the first specific condition is that voltages of two sides of the fourth switch are equal.

8. The inverter grid-connected system in claim 6, wherein the second specific condition is that voltages of two sides of the fifth switch are equal.

9. The inverter grid-connected system in claim 5, wherein the first relay and the second relay are turned on at the same time.

10. The inverter grid-connected system in claim 9, wherein the first specific condition is that voltages of two sides of the fourth switch are equal.

11. The inverter grid-connected system in claim 9, wherein the second specific condition is that voltages of two sides of the fifth switch are equal.

12. The inverter grid-connected system in claim 1, further comprising:

a voltage level adjusting module electrically connected to the inverter module to provide a direct current input voltage with the inverter module; and a filter electrically connected to the inverter module and the switching module to filter the alternating current electric power.

13. A method for implementing three-phase alternating current grid-connected transition used to feed an alternating current electric power generated by an inverter module to a three-phase alternating current electric grid, the method comprising:

(a) turning on a first route comprising a first switch connected to a second switch in series between the inverter module and the three-phase alternating current electric grid;

(b) turning on a second route comprising a third switch connected to a fourth switch in series between the inverter module and the three-phase alternating current electric grid after turning on the first route if a first specific condition is met; and (c) turning on a third route comprising a fifth switch connected to a sixth switch in series between the inverter module and the three-phase alternating current electric grid after turning on the first route or the second route if a second specific condition is met.

14. The method in claim 13, wherein the first specific condition is that a voltage level of a side of the inverter module connected to the second route is equal to a voltage level of a side of the three-phase alternating current electric grid connected to the second route.

15. The method in claim 13, wherein the second specific condition is that a voltage level of a side of the inverter module connected to the third route is equal to a voltage level of a side of the three-phase alternating current electric grid connected to the third route.

* * * * *